(12) United States Patent
Honbo et al.

(10) Patent No.: US 8,327,460 B2
(45) Date of Patent: Dec. 4, 2012

(54) PROBE MICROSCOPE AND MEASUREMENT METHOD USING THE SAME

(75) Inventors: Kyoko Honbo, Hitachinaka (JP);
Katsumi Mabuchi, Hitachi (JP);
Motoko Harada, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 339 days.

(21) Appl. No.: 12/662,234

(22) Filed: Apr. 7, 2010

(65) Prior Publication Data

US 2010/0257642 A1 Oct. 7, 2010

(30) Foreign Application Priority Data

Apr. 7, 2009 (JP) .................................. 2009-093081

(51) Int. Cl.
*G01Q 10/00* (2010.01)

(52) U.S. Cl. .................. 850/1; 850/18; 850/19; 850/21; 850/36; 850/39; 850/41; 850/43; 850/52; 850/59; 850/62; 850/15; 850/51; 204/193; 204/194; 204/242; 204/280; 204/400; 204/403; 204/403.15; 204/416; 205/790.15; 205/794.5; 205/799

(58) Field of Classification Search .................. 250/306, 250/307, 526; 204/193, 194, 242, 280, 400, 204/403.15, 416; 850/1, 18, 19, 21, 36, 39, 850/41, 43, 52, 59, 62; 205/790.15, 794.5, 205/799
See application file for complete search history.

(56) References Cited

U.S. PATENT DOCUMENTS

| | | | | | |
|---|---|---|---|---|---|
| 5,120,959 | A | * | 6/1992 | Tomita | 205/794.5 |
| 5,202,004 | A | * | 4/1993 | Kwak et al. | 205/790.5 |
| 6,123,817 | A | * | 9/2000 | Nakagawa | 204/400 |
| 6,245,204 | B1 | * | 6/2001 | Lindsay et al. | 204/400 |
| 2010/0306886 | A1 | * | 12/2010 | Harada et al. | 850/8 |

FOREIGN PATENT DOCUMENTS

JP 09-143799 6/1997

OTHER PUBLICATIONS

Allen J. Bard et al.; Scanning Electrochemical Microscopy: A New Technique for the Characterization and Modification of Surfaces; Acc. Chem. Res. 1990, pp. 357-363, vol. 23, No. 11, Austin, Texas 78712.
Kiyotaka Sasano et al.; In Situ Observation and Selective Electrochemical Deposition of Polypyrrole by Scanning Tunneling Microscope; Jpn. J. Appl. Phys. Jun. 1993, pp. L 863-L 865, vol. 32, Part 2, No. 6B.

* cited by examiner

*Primary Examiner* — Jack Berman
*Assistant Examiner* — Meenakshi Sahu
(74) *Attorney, Agent, or Firm* — Volpe and Koenig, P.C.

(57) ABSTRACT

The present invention allows simple and sensitive detection of microimpurities, microdefects, and corrosion starting points which may be present in a material. A probe microscope has a function to sense ions diffused from a specimen in a liquid. A probe is caused to scan over a predetermined range on a specimen. Then, the probe is fixed to a particular position in a liquid so as to set the distance between the specimen and the probe to a given value at which the microstructure of the specimen surface cannot be observed. Thereafter, one of the current between the probe and a counter electrode and the potential between the probe and a reference electrode is controlled, and the other of the current and potential which varies in accordance with the control is measured. Thus, ions diffused from the specimen are sensed.

18 Claims, 14 Drawing Sheets

Micron

Potential
(V vs. Platinum reference electrode)

PROBE MICROSCOPE AND MEASUREMENT METHOD USING THE SAME

CLAIM OF PRIORITY

The present application claims priority from Japanese application JP 2009-93081 filed on Apr. 7, 2009, the content of which is hereby incorporated by reference into this application.

BACKGROUND OF THE INVENTION

1. Field of the Invention

The present invention relates to a method and an apparatus for simply and sensitively detecting impurities, and in particular, to a method and an apparatus for carrying out impurity measurement, defect inspection, and corrosion evaluation for microstructures.

2. Background Art

In recent years, semiconductor integrated circuit devices have been configured to provide many functions, and there has been a demand for advanced integration in which a plurality of circuits are formed on one semiconductor chip. Furthermore, in order to reduce the manufacture costs of semiconductor integrated circuit devices, much effort has been made to develop a microwiring structure by reducing the widths of semiconductor elements and wires and the area of a semiconductor chip to increase the number of chips acquired per semiconductor wafer. For the improved reliability of devices such as chips or wafers including microwiring, a material needs to be developed which has few microimpurities and microdefects and which is unsusceptible to corrosion. A process technique for the material also needs to be developed. This also applies to hard disks, printed circuit boards, mounting materials, nanocomposite materials, and functional materials. The corrosion problem has been focused for, in addition to the above-described electronic components and materials, structural materials used for housings of power generation facilities and home appliances. In particular, if such a structural material is used in a high-temperature and high-humidity environment, a corrosion starting point is likely to be generated by long exposure to the high-temperature and high-humidity environment. Thus, the material is likely to be cracked or to become fragile.

Acc. Chem. Res., 23, 357 (1990) describes scanning electrochemical microscopy (SECM) which uses a probe composed of microelectrodes and in which electrodeposition of metal on specimen electrodes and etching of the surfaces of metal and semiconductor electrodes are locally carried out. Electrochemical reaction is caused on the substrate surface utilizing a local increase, at a position immediately below the probe, in the concentration of ion species generated on the probe.

Jpn. J. Appl. Phys., 32, L863 (1993) discloses local deposition, in a solution containing pyrrole, of polypyrrole on an HOPG substrate using an STM (Scanning Tunneling Microscope) probe. Specifically, the potential of a specimen substrate is set to a value obtained immediately before deposition of polypyrrole. The potential of the probe is set to a value larger than that of the specimen substrate. Then, the probe is used to scan the surface of the HOPG substrate. Thus, polypyrrole is locally deposited. The mechanism of this reaction has been discussed as follows. First, a pyrrole monomer is oxidized on the STM probe. Pyrrole is adsorbed on HOPG more easily than the probe. Hence, the subsequent polymerization reaction progresses on the HOPG.

In JP 9-143799 A, a first working electrode and a second working electrode (probe) are installed in a liquid; the first working electrode is used as a specimen serving as a site of electrochemical reaction, and the second working electrode is located locally opposite the first working electrode. The potential of each of the first and second working electrodes is set to a given value. The inter-surface distance D between the two working electrodes is set to a given value equal to or smaller than the value of thickness of an electric double layer in the liquid. Then, the potential of the second working electrode or the inter-surface distance D is varied to control the electrochemical reaction on the first working electrode. This invention is intended to control the electrochemical reaction on the specimen electrode by controlling the potentials of the two working electrodes. That is, this invention corresponds to a method for controlling dissolution (etching) and deposition reaction on the specimen surface.

SUMMARY OF THE INVENTION

In all of the above-described conventional methods, the substrate surface, that is, the specimen needs to be connected to an electrochemical apparatus. However, when the specimen is connected to the electrochemical apparatus and caused to react, ions present near the specimen surface may disadvantageously fail to be accurately qualitatively evaluated and quantified. In the STM configuration, in which a tunneling current may flow, when an oxidation reduction current generated among a small amount of ions present near the specimen surface is sensed, the tunneling current is added to the oxidation reduction current. This prevents accurate qualitative evaluation and quantification.

Based on the above-described conventional techniques, the present invention provides a method and an apparatus for more simply and sensitively detecting impurities, defects, corrosion starting points, and the like which may be present in devices such as chips or wafers including microwiring, hard disks, printed circuit boards, mounting materials, nanocomposite materials, functional materials, and the like.

In the present invention, based on the principle of an atomic force microscope, a probe is used to scan a predetermined range on a specimen to measure the recessed and protruding shape of the specimen. Thus, a position on the specimen is selected at which ions are to be measured. Thereafter, at the selected position on the specimen immersed in a liquid, the distance between the specimen and the probe is set to a given value at which the microstructure of the specimen surface cannot be observed. The probe is fixed to a particular position in the liquid and then used to detect the type and concentration of ions diffused from the specimen. When the type and concentration of ions are detected, a signal sensed by the probe is converted into data, which is then graphically displayed and imaged. Moreover, based on the signal sensed by the probe, the ion type is analyzed, and the ion concentration is calculated. The results are graphically displayed and imaged.

Furthermore, with the probe microscope according to the present invention, a specimen is immersed in liquids with various compositions to elute impurities present on the specimen surface. This eliminates the need to allow electrochemical reaction to progress on the specimen surface contrary to the conventional art. That is, the present invention prevents the specimen from being modified by oxidation reduction reaction arbitrarily caused using an external circuit. Furthermore, a selective combination of a specimen and a liquid allows observation of the degree to which the specimen is corroded by the liquid.

Thus, the present invention allows sensing of ions present at a particular position in the liquid near the surface of the specimen. This enables the type and concentration of the ions to be simply and sensitively detected. Furthermore, the specimen may be a chip, a wafer, a hard disk, a printed circuit board, a mounting material, a nanocomposite material, a functional material, or a structural material used for, for example, a housing of a power generation facility or a home appliance. Hence, the reliability of these devices and materials can be improved. The present invention can provide an impurity measurement apparatus, a defect inspection apparatus, and a corrosion evaluation apparatus which can detect microimpurities, microdefects and corrosion starting points in the devices and materials.

A probe microscope according to the present invention includes a test cell configured to hold a specimen and receive a liquid, a probe, a counter electrode, a reference electrode, a driving mechanism configured to cause the probe to scan based on a principle of an atomic force microscope so that the probe follows a specimen surface, a potential control section configured to control a potential between the probe and the reference electrode, and a current measuring section configured to measure a current flowing between the probe and the counter electrode. With the probe located at a predetermined distance, in the liquid, away from the specimen surface measured based on the principle of the atomic force microscope, the potential control section controls the potential between the probe and the reference electrode. The current measuring section measures the current flowing between the probe and the counter electrode. Then, the type of ions in the liquid is detected based on the potential at which the measured current indicates a peak. Furthermore, an ion concentration is determined based on the magnitude of the current indicative of the peak.

Here, the probe microscope may include a database configured to store, as data, a relationship between the ion type and the potential at which the current measured by the current measuring section indicates a peak, and the measurement result is checked against the database to detect the type of the ions in the liquid. Alternatively, the database may be configured to store data indicating the relationship between the ion concentration and the magnitude of the current indicating a peak, and the measurement result is checked against the database to determine the ion concentration.

Furthermore, a probe microscope according to the present invention includes a test cell configured to hold a specimen and receive a liquid, a probe, a counter electrode, a reference electrode, a driving mechanism configured to cause the probe to scan based on a principle of an atomic force microscope so that the probe follows a specimen surface, a current control section configured to control a current flowing between the probe and the counter electrode, and a potential measuring section configured to measure a potential between the probe and the reference electrode. With the probe located at a predetermined distance, in the liquid, away from the specimen surface measured based on the principle of the atomic force microscope, the current control section controls the current flowing between the probe and the counter electrode. The potential measuring section measures the potential between the probe and the reference electrode. Then, the type of ions in the liquid is detected based on the value of a constant measured potential. Furthermore, an ion concentration is determined based on a time when the constant potential is indicated.

Here, the probe microscope may include a database configured to store a relationship between the ion type and the value of a constant potential measured by the potential measuring section, and the measurement result is checked against the database to detect the type of the ions in the liquid. Alternatively, the database may be configured to store data indicating the relationship between the ion concentration and the time when the constant potential is indicated, and the measurement result is checked against the database to determine the ion concentration.

A measurement method according to the present invention includes a step of scanning with a probe based on a principle of an atomic force microscope in an environment involving one of air, vacuum, atmosphere gas, and liquid, to measure a recessed and protruding shape of a specimen, a step of fixing the probe to a particular position in a liquid near a surface of the specimen corresponding to the measured shape, a step of controlling a potential between the probe and a reference electrode both immersed in the liquid and measuring a current between the probe and a counter electrode to detect the potential at which the current indicates a peak, a step of identifying an ion species in the liquid based on the potential at which the current indicates a peak, and a step of determining an ion concentration based on the magnitude of the peak current. In this method, the ion type is determined based on an oxidation potential and/or a reduction potential of ions present in the liquid.

Furthermore, a measurement method according to the present invention includes a step of scanning with a probe based on a principle of an atomic force microscope in an environment involving one of air, vacuum, atmosphere gas, and liquid, to measure a recessed and protruding shape of a specimen, a step of fixing the probe to a particular position in a liquid near a surface of the specimen corresponding to the measured shape, a step of controlling a current between the probe and a counter electrode both immersed in the liquid and measuring a potential between the probe and a reference electrode to detect the value of a constant measured potential, a step of identifying an ion species in the liquid based on the detected potential, and a step of determining an ion concentration based on a time when the constant potential is indicated. In this method, the ion concentration is determined based on an oxidation current and/or a reduction current of ions present in the liquid.

If scanning proceeds three-dimensionally in the liquid from the specimen surface toward an area away from the specimen surface, the total amount of ions can be determined, and the solubility and diffusivity of the substance can be specifically quantified. On the other hand, owing to an enormous amount of time required to complete all the measurements, this method is unsuitable for measurement systems with significant diffusivity. In the present invention, at a particular position selected from shape data on the specimen, for example, at a defect, a flaw, a hole, a pit, or the like, the probe is fixed at any distance from the surface to quickly measure the ions present at the position. Thus, the total amount of the ions present near the specimen surface can be measured in a short time with the ions prevented from diffusing away from the specimen surface.

The present invention allows simple and sensitive detection of impurities present on a device such as a chip or wafer including microwiring. The present invention can also provide an impurity inspection apparatus capable of simply and sensitively detecting impurities.

BRIEF DESCRIPTION OF THE DRAWINGS

The patent or application files contains at least one drawing executed in color. Copies of this patent or patent application publication with color drawings will be provided by the Office Upon request and payment of the necessary fee.

DETAILED DESCRIPTION OF THE PREFERRED EMBODIMENTS

Figure 1:
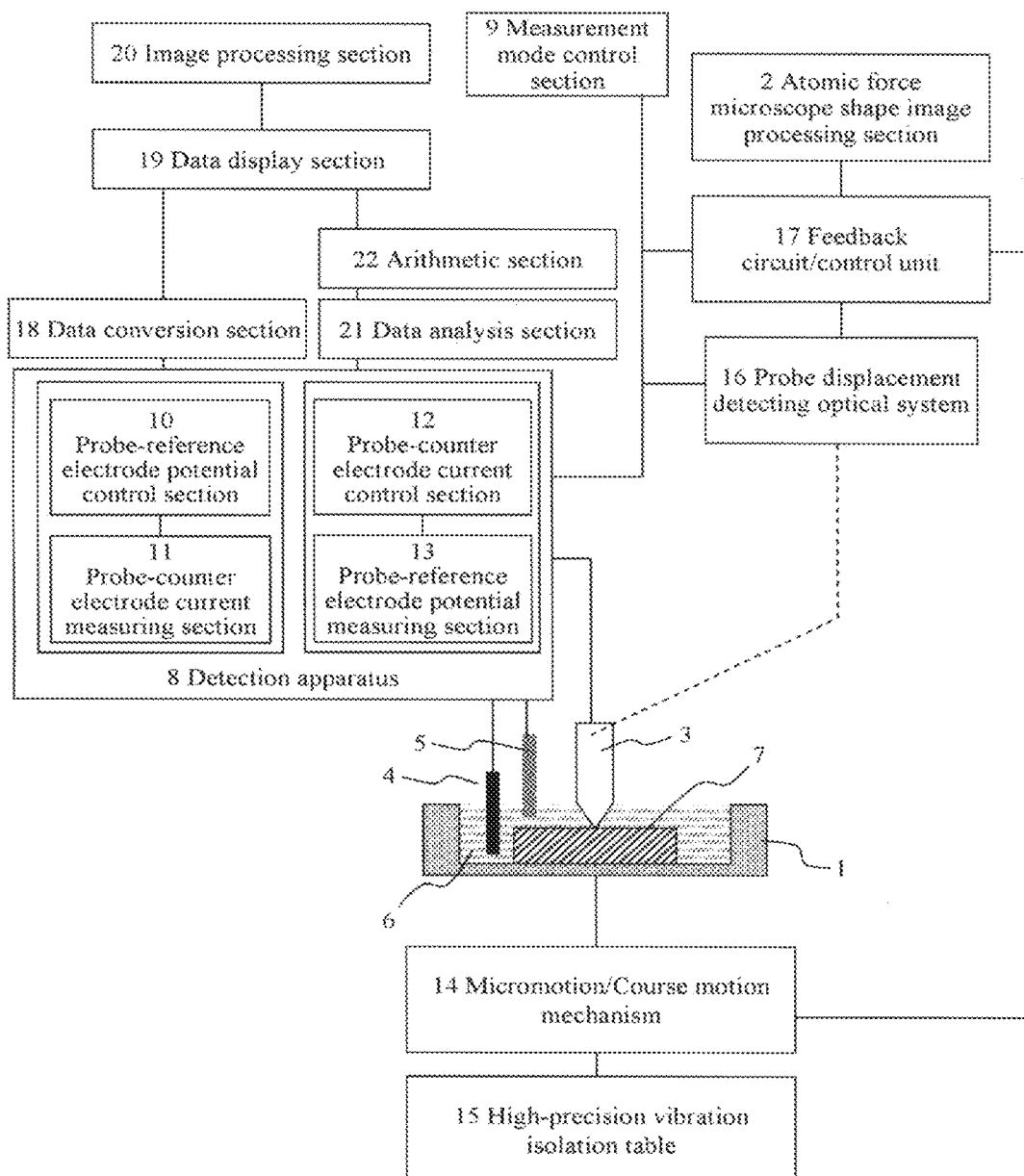
FIG. 1 is a schematic diagram showing the configuration of an example of a probe microscope according to the present invention.

The present inventors examined observation of impurities eluted from a specimen immersed in a liquid. In particular, the capability of simply and sensitively detecting impurities in a liquid enables specific determination of whether or not impurities from the specimen are present in the liquid. Thus, examining the corrosion behavior of the specimen enables the characteristics of the specimen to be determined in detail. As a result, the present invention can be used as an inspection method or an analysis tool for semiconductor chips and atomic materials, thus contributing to developing more densely integrated devices and improving the reliability of devices. The present inventors thus focused on an atomic force microscope.

A probe microscope according to the present invention has a shape measurement mode and an ion measurement mode. In the shape measurement mode, the probe microscope measures the shape of a specimen based on the principle of an atomic force microscope. The atmosphere in which the shape of the specimen is measured may be air, vacuum, nitrogen or argon, or any other atmosphere gas and may be at high humidity, high temperature, or low temperature or in a liquid. For measurement in a liquid, the following combinations are possible. For a housing of a power generation facility or a home appliance, the degree to which the housing is corroded in salt water is measured. For a chip or wafer including microwiring, the degree to which the chip or wafer becomes defective in various liquids used in manufacturing processes and the like, for example, a plating solution, a chemical mechanical polishing solution (CMP slurry solution), and a cleaning liquid used in various cleaning steps, is measured. Based on the resultant shape information, a particular site, that is, a defect or flaw, a hole, a pit, a raised portion, or the like is selected.

Then, the probe microscope shifts to the ion measurement mode. The probe, the specimen, a counter electrode, and a reference electrode are arranged in the liquid. A second liquid such as acid, alkali, or salt water is fed onto the specimen surface. Any distance is set between the specimen and a position in the liquid near the specimen surface to which the second liquid has been fed. The probe is then fixed. The type and concentration of ions present at the above-described position are detected. The reference electrode indicates a reference potential based on which a potential is applied to, for example, the specimen or the probe. The reference electrode has an invariable potential. The counter electrode is a working electrode, for example, an electrode configured to operate in a pair with the specimen or the probe to cause oxidation reduction reaction. The counter electrode has a variable potential. Thus, the functions of the counter electrode and the reference electrode are not interchangeable. Specifically, with the potential of the specimen not controlled with respect to the reference electrode, the potential of or a current through the probe is variably controlled with respect to the reference electrode. As a result, the type and concentration of ions dissolved into the liquid can be measured with no electrochemical change made to the specimen. Thus, impurities contained in a structural material, an electronic component, and a material used for the electronic component, a defect present on the surface, a corrosion starting point or the like is evaluated. Furthermore, the levels of interactions between the liquid composition and the specimen surface, that is, reactivity, solubility, corrosion resistance and the like can be determined.

For measurement of ions, for example, only the potential of the probe is variably controlled with respect to the reference electrode, and a current flowing through the probe and counter electrode is electrochemically measured. The detected current value is then drawn in graph or imaged. Examples of the control method include a sweep method of varying the potential at a constant speed, a step method of varying the potential at regular time intervals in a stepwise fashion, and a pulse method of instantaneously applying a potential. The distance between the specimen and the probe is controlled to a constant value. The peak of the current value is detected, and the corresponding potential is determined. The type of ions can be determined because the peak potential varies depending on the type. If impurities are mixed in the specimen, the peak indicates the mixed impurities. Furthermore, if the specimen includes defective or corrosion, for example, in copper wiring, copper ions are likely to be generated at the corresponding site. Thus, a peak corresponding to the wiring material is detected. In the present invention, any well-known electrochemical measurement methods are applicable. The measurement method is not limited to the above-described variable control based only on the potential. Various measurement methods such as a constant potential method, cyclic voltammogram, and chronopotentiometry are applicable.

Examples of the ion detection method include a method potential of the probe with respect to the reference electrode is scanned to the positive side with respect to a natural potential to oxidize ions on the probe and a method in which potential of the probe with respect to the reference electrode is scanned to the negative side with respect to the natural potential to reduce ions on the probe. The oxidation method is as follows. When ions are oxidized, an oxidation current flows between the probe and the counter electrode. At this time, the ion type is determined based on the potential of the probe with respect to the reference electrode. The ion concentration is determined based on the magnitude of the oxidation current. The reduction method is as follows. When ions are reduced, a reduction current flows between the probe and the counter electrode. At this time, the ion type is determined based on the potential of the probe with respect to the reference electrode. The ion concentration is determined based on the magnitude of the reduction current.

The present invention enables simultaneous acquisition of a signal for the shape of the specimen surface and a signal allowing the ion type and/or the ion concentration to be detected in the liquid. To acquire the shape signal and then the signal allowing the ion type and/or concentration to be detected, the probe is desirably retracted at least 20 nm and at most 10 μm from the specimen surface. If the distance is shorter than 20 nm, a tunneling current undesirably flows between the specimen surface and the probe. Furthermore, if the distance is longer than 10 μm, the probe covers not only ions diffused from a particular position on the specimen surface but also ions diffused from areas around the particular position.

Such measurement is characterized by enabling analysis in comparison with the shape of the specimen surface. That is, if measurement of the shape results in detection of a defect or a change in shape such as recesses and protrusions on the surface, it can be analyzed whether or not ions dissolved in the liquid are detected in a part of the specimen surface which involves the change in shape. Thus, the causal relationship between the shape and the dissolved ions can be clarified.

The present invention will be described below in further detail with reference to embodiments shown in the drawings.
[Embodiment 1]

In Embodiment 1, an example of a probe microscope used to observe specimens will be described by mainly using the mechanism of an atomic force microscope (AFM). FIG. 1 is a schematic diagram of a probe microscope according to the present embodiment.

The apparatus according to the present embodiment includes a test cell 1 and a movement mechanism 14 configured to move the position of the test cell 1. A probe 3, a counter electrode 4, and a reference electrode 5 are provided so as to lie in the test cell 1. The movement mechanism 14 is capable of both coarse motion that largely changes the position of the test cell 1 and micromotion that fine-tunes the position of the test cell 1. When a liquid 6 is poured in the test cell 1, the probe 3, the counter electrode 4, and the reference electrode 5 are immersed in a liquid 6.

A specimen 7 to be inspected for defects, impurities, and the like is housed in the test cell 1. The specimen 7 can be fixed to the test cell 1 via an O ring or the like. A detection apparatus 8 is connected to the probe 3, the counter electrode 4, and the reference electrode 5 but not to the specimen 7.

When one of the potential and the current is changed, the detection apparatus 8 detects a corresponding change in the other of the potential and the current. A measurement mode control section 9 configured to controllably switch the measurement mode can automatically switch between the shape measurement mode and the ion measurement mode to perform both shape measurement and impurity measurement. The measurement mode control section 9 can perform, in each mode, feedback control on the movement mechanism to control the distance between the specimen 7 and the probe 3 to a constant value.

The detection apparatus 8 includes a potential control section 10 configured to control the potential between the probe 3 and the reference electrode 5, and a current measuring section 11 configured to detect the current flowing between the probe 3 and the counter electrode 4. The potential control method may be a chronoamperometry method (sometimes referred to as a constant potential method) of maintaining the potential constant, a cyclic voltammetry method of scanning the potential at a constant speed, or any other control method. The detection apparatus 8 further includes a current control section 12 configured to control the current flowing between the probe 3 and the counter electrode 4 and a potential measuring section 13 configured to measure the potential between the probe 3 and the reference electrode 5.

The test cell 1 is located on a micromotion/coarse motion mechanism 14. The micromotion/coarse motion mechanism 14 includes a Z axis direction coarse motion mechanism configured to allow the probe 3 located away from the specimen 7 to approach the specimen 7, and an XYZ micromotion mechanism configured to enable fine relative movement of the specimen 7 and the probe 3 in a horizontal (XY) direction and a vertical (Z) direction. The micromotion/coarse motion mechanism 14 is located on a high-precision vibration isolation table 15 configured to isolate external vibration.

In the shape measurement mode, the micromotion/coarse motion mechanism 14 moves the test cell 1 to move the probe 3 and the specimen 7 closer to each other. In accordance with the principle of the atomic force microscope, the probe 3 is allowed to approach the surface of the specimen 7 to detect the interactive force (atomic force) between the probe 3 and the specimen 7 based on the displacement of the probe 3. With the interactive force maintained constant, the scanning is performed. Thus, a change in shape is measured with the distance between the probe 3 and the specimen 7 maintained constant.

A probe displacement detecting optical system 16 is composed of a light source and a photo detector. The optical axis of detection light emitted by a light source impinges on the tip of the probe 3 or a part of the probe 3 which follows the displacement. Reflected light from the probe 3 is detected by the photo detector. The micromotion/coarse motion mechanism 14 moves the probe 3 closer to the specimen 7 to an area where the probe 3 and the specimen 3 interact with each other. Based on the reflected light detected by the probe displacement detecting optical system 16, a probe displacement signal is output to a feedback circuit/control unit 17. The feedback circuit/control unit 17 uses the micromotion/coarse motion mechanism 14 to control the distance between the probe 3 and the specimen 7 so as to maintain the probe displacement signal constant. The displacement signal and a control signal from the feedback circuit/control unit 17 are subjected to data processing by an atomic force microscope image processing section 2. The signals are thus processed into a shape image for the atomic force microscope.

In the ion measurement mode, based on the reflected light detected by the probe displacement detecting optical system 16, a probe displacement signal is output to the feedback circuit/control unit 17. The feedback circuit/control unit 17 uses the micromotion/coarse motion mechanism 14 to controllably maintain the distance between the probe 3 and the specimen 7 constant. The distance between the probe 3 and the specimen 7 is fixed to a value of at least 20 nm and at most 10 μm.

Based on the signal obtained from the current measuring section 11, a curve is obtained by plotting the current with respect to any potential on the axis of ordinate, while plotting time on the axis of abscissas or by plotting the current on the axis of ordinate, while plotting the potential on the axis of abscissas. A data conversion section 18 is used to obtain those curves. Moreover, the curve is graphically displayed. A data display section 19 is used to display the curve. The data is three-dimensionally imaged by expressing each measurement position on the X and Y coordinate axes, while expressing the potential with respect to any current on the Z axis. The image processing section 20 is used for the imaging.

Based on the signal obtained from the potential measuring section 13, a curve is obtained by plotting the potential with respect to any current on the axis of ordinate, while plotting time on the axis of abscissas or by plotting the potential on the axis of ordinate, while plotting the current on the axis of abscissas. A data conversion section 18 is used to obtain the curves. Moreover, the curves are graphically displayed. The data display section 19 is used to display the curves. The data is three-dimensionally imaged by expressing each measurement position on the X and Y coordinate axes, while expressing the potential with respect to any current on the Z axis. The image processing section 20 is used for the imaging.

Based on the signals obtained from the current measuring section 11 and the potential measuring section 13, the ion type is identified. The data analysis section 21 can hold a database in which the relationship between the current and the potential for many known types of ions is recorded. The ion type can be identified by checking the signals obtained through the measurement against the database. Thus, ion types likely to be detected are pre-measured according to the present embodiment to acquire electrochemical data, which is then saved to the data analysis section 21.

Figure 2:
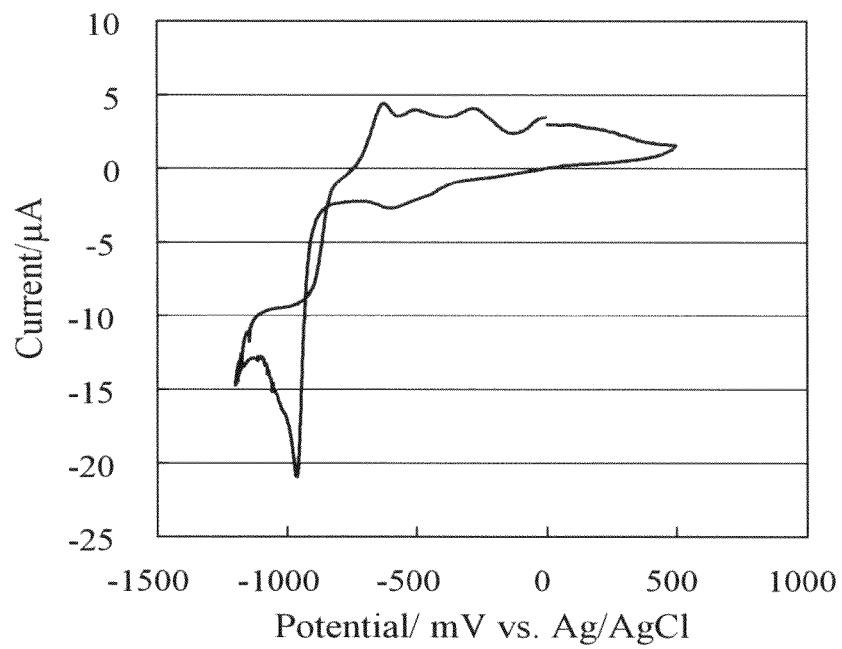
FIG. 2 is a diagram showing an example of electrochemical data saved to a data analysis section.

FIG. 2 is a diagram showing an example of electrochemical data saved to the data analysis section 21. The axis of ordinate indicates the current, and the axis of abscissas indicates the potential of the probe obtained when the reference electrode is formed of Ag/AgCl. FIG. 2 shows the results of detection of a current flowing between the probe and the counter electrode when the potential of the probe with respect to the reference electrode is varied at a scan speed of 20 mV/sec. in order of 0 V, 500 mV, −1,200 mV, and 0 V. An electrolytic solution is 0.1 mol of salt water with 1,000 ppm of iron ions added. A negative current flows near −950 mV and corresponds to the peak at which Fe ions are reduced to metal Fe. When the same electrolytic solution, the same reference electrode, the same scan speed, and the same scan potential conditions are used, if a peak is detected near −950 mV, then the apparatus determines that Fe has been detected.

Figure 3:
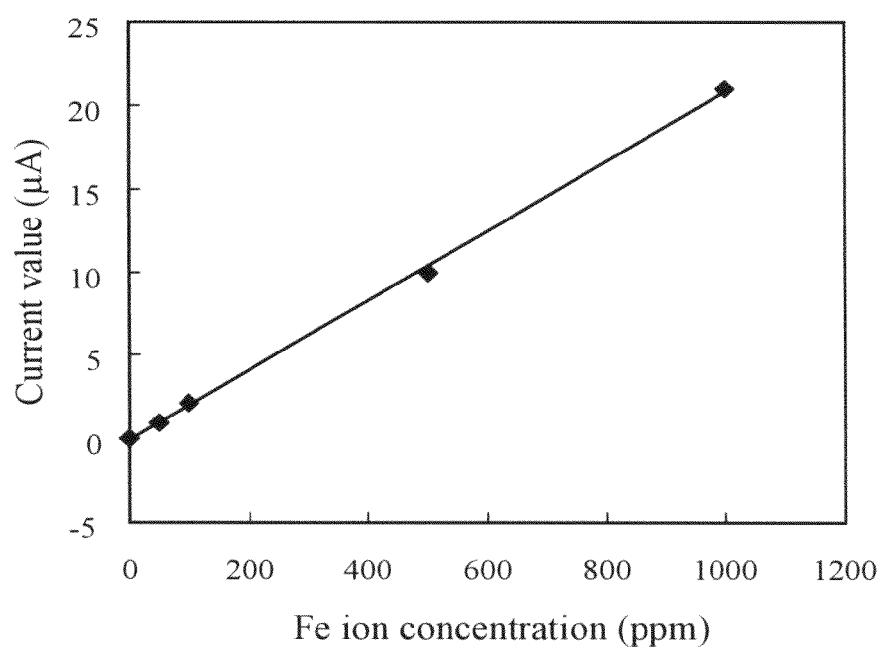
FIG. 3 is a diagram showing an example of a standard curve for an ion concentration.

Based on the signals obtained from the current measuring section 11 and the potential measuring section 13, the ion concentration is calculated. A arithmetic section 22 can store many databases for known ion concentrations. The databases can store arithmetic expressions designed to calculate the ion concentration based on the databases, the signals obtained through measurement, and apparatus-specific coefficients. FIG. 3 shows what is called a standard curve as an example of a database for the Fe ion concentration; the relationship between the current and the potential is measured by varying the amount of iron ions added in order of 1,000 ppm, 500 ppm, 100 ppm, and 50 ppm in a manner similar to that shown in FIG. 2, and then based on the relationship, the peak current values appearing near −950 mV are plotted with respect to the concentration of Fe ions. An approximate expression for the straight line resulting from the plotting is shown below. Note that Y denotes current value and X denotes Fe concentration.

$$Y=0.0209X-0.0807 \qquad (1)$$

Then, the following arithmetic expression is obtained.

$$X=47.8Y+3.86 \qquad (2)$$

When the same electrolytic solution, the same reference electrode, the same scan speed, and the same scan potential conditions are used, if an Fe peak is detected near −950 mV, the corresponding current value is measured and substituted into Y in Arithmetic Expression (2). Thus, X, that is, the Fe ion concentration is determined. In this manner, a solution in which ions of a known concentration are present is pre-measured according to the present embodiment to acquire electrochemical data, which is then saved to the arithmetic section 22. At this time, a standard curve indicative of the relationship between the concentration and the current value is created and also saved to the arithmetic section 22. Based on the standard curve, apparatus-specific coefficients are calculated and also saved to the arithmetic section 22. Based on these data, the concentration of ions present near the surface of the specimen 7 is calculated.

Figure 4:
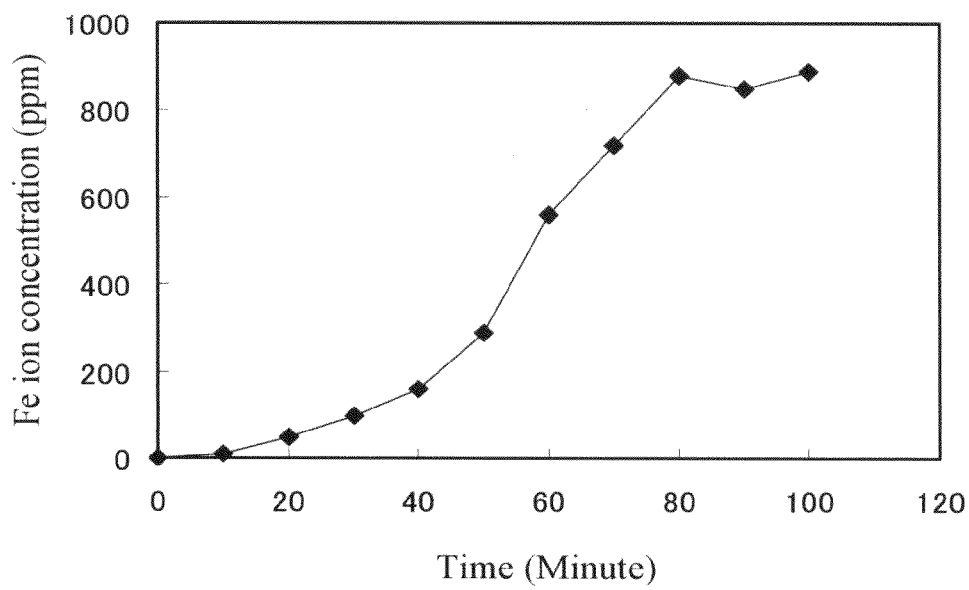
FIG. 4 is a diagram showing an example of the relationship between the ion concentration and measurement time.
Figure 5:
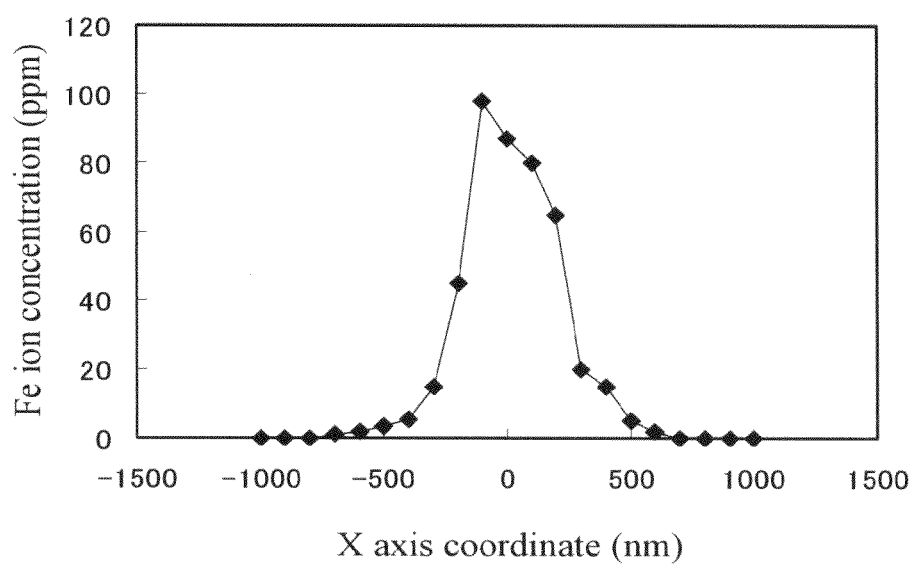
FIG. 5 is a diagram in which the measured ion concentration is plotted on the axis of ordinate, whereas the X axis of a measurement point is plotted on the axis of abscissas.

Based on the ion type or concentration, a curve is displayed which is obtained by plotting the concentration for each ion on the axis of ordinate, while plotting time on the axis of abscissas. Alternatively, a curve is displayed which is obtained by plotting the concentration for each ion on the axis of ordinate, while plotting the X or Y axis of the measurement point on the axis of abscissas. To achieve this, the data display section 19 is used. FIG. 4 shows a curve obtained by plotting the Fe ion concentration obtained by the method described above on the axis of ordinate, while plotting measurement time on the axis of abscissas. FIG. 5 shows a curve obtained by plotting the Fe ion concentration obtained by the method described above on the axis of ordinate, while plotting the X axis of the measurement point on the axis of abscissas.

The resultant data is imaged by expressing each measurement position on the X and Y coordinate axes, while expressing the ion types in different colors. Alternatively, the data is three-dimensionally imaged by expressing each measurement position on the X and Y coordinate axes, while expressing the ion concentration on the Z axis. The image processing section 20 is used for the imaging. A specific embodiment will be described below.

The detection method according to the first embodiment is as follows.

(1) The measurement mode control section 9 selects the shape measurement mode. The conventional method is used to acquire an atomic force microscope image and to analyze the image. At this point in time, a geometrical specific point such as a defective portion, a pit, or a raised portion is marked.

(2) The measurement mode control section 9 selects the ion measurement mode. The probe is moved to the marked X and Y coordinates. The distance on the Z axis is maintained constant at 20 nm or more and 10 μm or less.

(3) A liquid is fed onto the surface of the specimen 7. The amount of the liquid fed may be small and has only to allow the probe tip to be immersed in the liquid. The combination of the liquid and the specimen is not particularly limited. For example, if housings for automotive parts may be corroded by sea water, the degree to which the housings are corroded in salt water (a water solution of sodium chloride) is measured. If chips or wafers including microwiring need to be checked for defects during a manufacturing process, the degree to which the chips or wafers become defective in a plating solution, a chemical mechanical polishing solution (CMP slurry solution), and cleaning liquids used in various cleaning steps is measured.

(4) The potential control section 10 built in the detection apparatus 8 controls the potential between the probe 3 and the reference electrode 5. The conventional potential control method is appropriately used. For example, in the cyclic voltammetry method in which the potential is scanned at a constant speed, the potential is scanned to the negative side from the natural potential between the probe 3 and the reference electrode 5. The current measuring section 11 detects a current flowing between the probe 3 and the counter electrode 4, that is, a reduction current. The current measuring section 11 measures the peak potential at which the reduction current is maximized as well as the current value.

(5) Based on a signal obtained from the current measuring section 11, the data conversion section 18 acquires a current potential curve in which the current is plotted on the axis of ordinate, whereas the potential is plotted on the axis of abscissas. The data display section 19 graphically displays this curve.

(6) The data analysis section 21 identifies the ion type based on the peak potential at which the reduction current is maximized. Databases for a plurality of ion types that are likely to be present are pre-stored. The data analysis section 21 checks the measured potential against the databases to select the ion type for which the measured potential is closest to one of the database values.

(7) Based on the peak current value at which the reduction current is maximized, the arithmetic section 22 calculates the ion concentration. Databases for a plurality of concentrations for each ion type are pre-stored. The arithmetic section 22 prepares a standard curve indicative of the relationship between the concentration and the current value, apparatus-specific coefficients, and an arithmetic expression required to calculate the ion concentration. The arithmetic section 22 then checks the current value obtained through measurement against the databases to calculate the ion concentration.

(8) The probe is moved around the marked X and Y coordinates and similar measurement is performed at a plurality of the measurement positions.

(9) The image processing section 20 is used to express each measurement position on the X and Y coordinate axes, while expressing the peak potential at which the reduction current is maximized, on the Z axis. The image processing section 20 thus three-dimensionally images the data.

(10) The image processing section 20 is used to express each measurement position on the X and Y coordinate axes, while expressing the peak current value at which the reduction current is maximized, on the Z axis. The image processing section 20 thus three-dimensionally images the data.

(11) The data display section 19 is used to display a curve in which, based on the ion type and concentration, the concentration for each ion type is plotted on the axis of ordinate, whereas the X or Y axis of the measurement point is plotted on the axis of abscissas.

(12) The image processing section 20 is used to image the data by expressing each measurement position on the X and Y coordinate axes, while expressing the different ion types in the respective colors.

(13) The image processing section 20 is used to three-dimensionally image the data by expressing each measurement position on the X and Y coordinate axes, while expressing the ion concentration on the Z axis.

The probe microscope shown in FIG. 1 was used to observe stainless steel as a specimen. The current value was measured with the potential maintained at a value at which Fe is reduced. The detection method is as follows.

Figure 6:
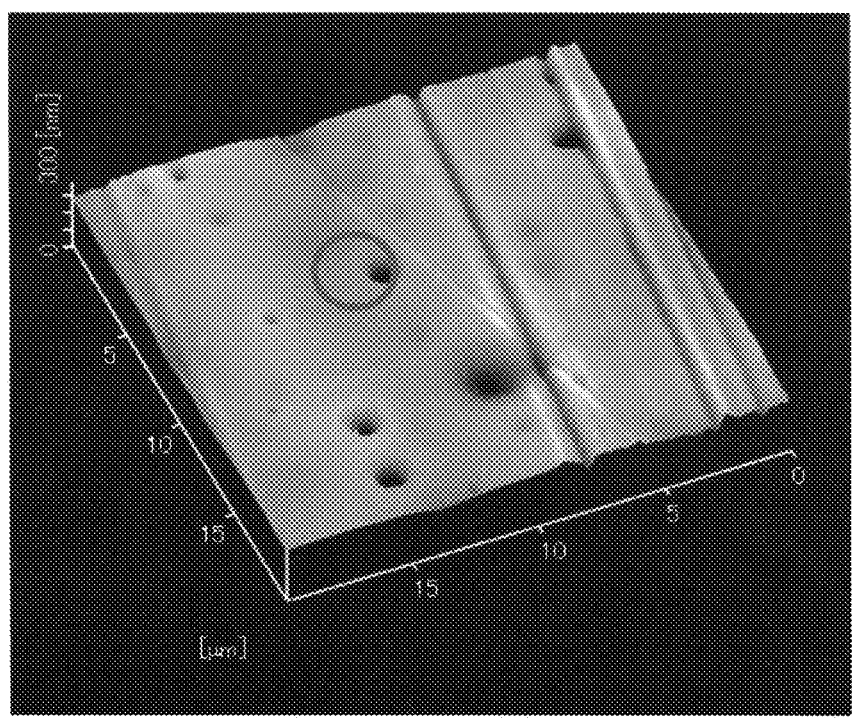
FIG. 6 is a diagram showing an example of an atomic force microscope image in which a specific point is marked.

(1) The measurement mode control section 9 selects the shape measurement mode. The conventional method is used to acquire an atomic force microscope image and the image is analyzed. At this point in time, a geometrical specific point such as a defective portion, a pit, or a raised portion is marked. (The position is shown by a circle in FIG. 6)

(2) The measurement mode control section 9 selects the ion measurement mode. The probe is moved to the marked X and Y coordinates. The distance on the Z axis is maintained constant at 20 nm or more and 10 μm or less.

(3) 0.1 mol of solution of sodium chloride is fed onto the surface of the specimen 7. The amount of the liquid fed may be small and has only to allow the probe tip to be immersed in the liquid.

(4) The potential control section 10 built in the detection apparatus 8 controls the potential between the probe 3 and the reference electrode 5. The conventional potential control method is appropriately used. For example, in the chronoamperometry method in which the potential is maintained at a constant state, the potential between the probe 3 and the reference electrode 5 is controllably maintained for any period of time. The current measuring section 11 detects a current flowing between the probe 3 and the counter electrode 4, that is, a reduction current.

Figure 7:
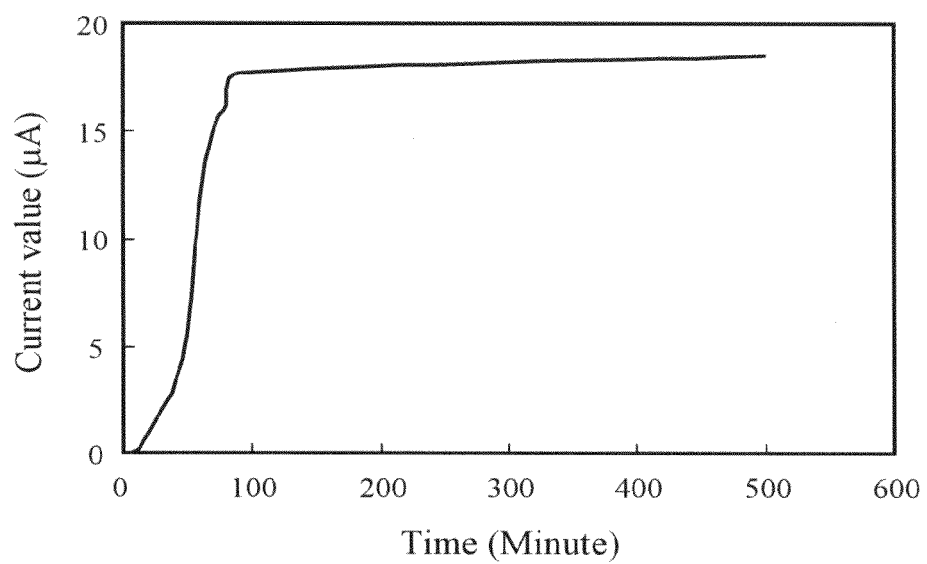
FIG. 7 is a diagram of a current curve in which a current obtained when an Fe potential is maintained is plotted on the axis of ordinate, whereas time is plotted on the axis of abscissas.

(5) Based on a signal obtained from the current measuring section 11, the data conversion section 18 acquires a current curve in which the current is plotted on the axis of ordinate, whereas time is plotted on the axis of abscissas. The data display section 19 graphically displays this curve. FIG. 7 shows a current curve in which the current obtained when the Fe potential (as shown in FIG. 2, −950 mV) is maintained is plotted on the axis of ordinate, whereas time is plotted on the axis of abscissas.

(6) Based on the current value, the arithmetic section 22 calculates the ion concentration. Databases for a plurality of concentrations for each ion type are pre-stored. The arithmetic section 22 prepares a standard curve indicative of the relationship between the concentration and the current value, apparatus-specific coefficients, ad an arithmetic expression required to calculate the ion concentration. The arithmetic section 22 obtains what is called a standard curve by measuring the relationship between the current and time under the same conditions as those in the above-described measurement method with the amount of added iron ions varied in order of 1,000 ppm, 500 ppm, 100 ppm, and 50 ppm, and based on the relationship, plotting the maximum absolute current value with respect to the Fe ion concentration. The arithmetic section 22 thus obtains Arithmetic expression (3) where Y denotes the current value, X denotes the Fe concentration, and the coefficient values are specific to the apparatus.

$$X=27.3Y+5.42 \qquad (3)$$

The arithmetic section 22 then checks the current value obtained through measurement against the databases to calculate the ion concentration. FIG. 7 shows that the maximum absolute current value is 19 μA. The value is substituted into Y in Expression (3) to obtain an Fe ion concentration of 520 ppm.

(7) The probe is moved to around the marked X and Y coordinates and similar measurement is performed at a plurality of the measurement positions.

Figure 8:
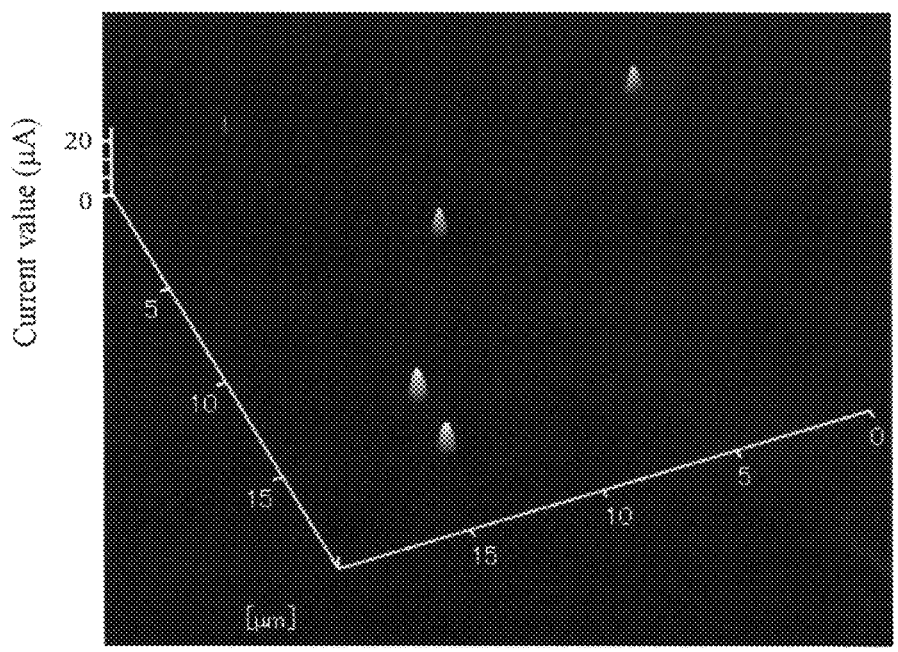
FIG. 8 is a diagram of three-dimensional image in which a current value is plotted at each measurement position.

(8) The image processing section 20 is used to express each measurement position on the X and Y coordinate axes, while expressing the current value on the Z axis. The image processing section 20 thus three-dimensionally images the data. FIG. 8 shows a three-dimensional image obtained by expressing each measurement position on the X and Y coordinate axes, while expressing the current value on the Z axis.

Figure 9:
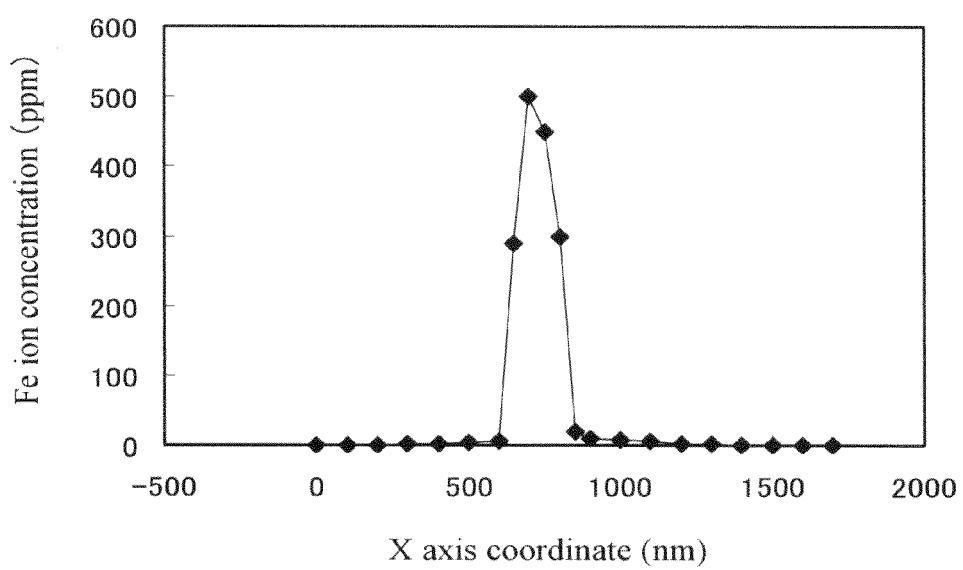
FIG. 9 is a diagram in which the ion concentration is plotted on the axis of ordinate, whereas the X axis of the measurement point is plotted on the axis of abscissas.

(9) The data display section 19 is used to display a curve in which the ion concentration is plotted on the axis of ordinate, whereas the X or Y axis of the measurement point is plotted on the axis of abscissas. FIG. 9 shows a curve in which the ion concentration is plotted on the axis of ordinate, whereas the X axis of the measurement point is plotted on the axis of abscissas.

Figure 10:
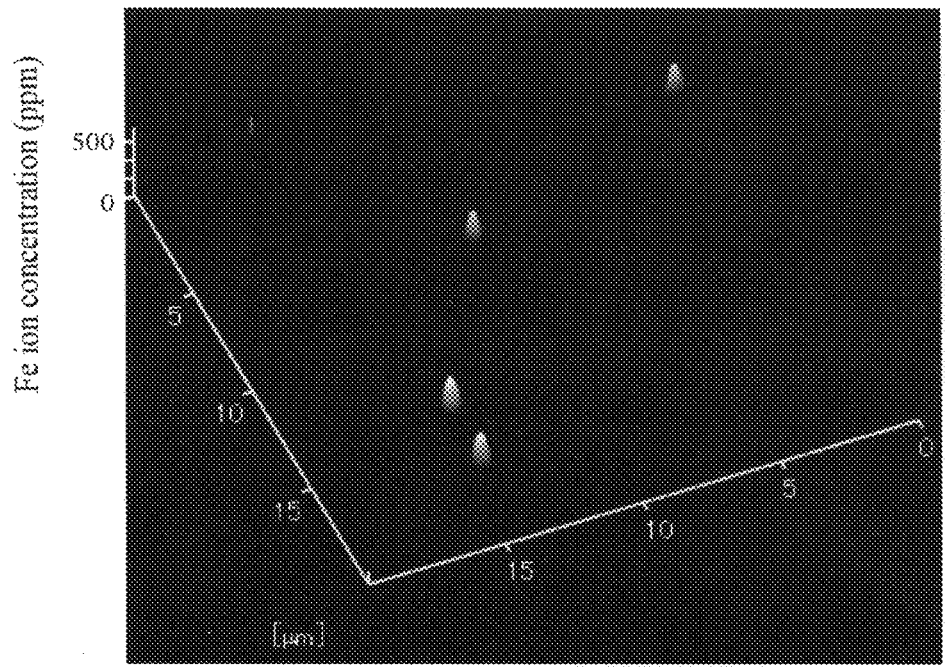
FIG. 10 is a diagram of three-dimensional image in which the Fe ion concentration at each measurement position is plotted.

(10) The image processing section 20 is used to three-dimensionally image the data by expressing each measurement position on the X and Y coordinate axes, while expressing the ion concentration on the Z axis. FIG. 10 shows a three-dimensional image obtained by expressing each measurement position on the X and Y coordinate axes, while expressing the Fe ion concentration on the Z axis. In this case, the pitch between measurement points is 200 nm on both the X and Y axes. The values between the measurement points are approximated using the least square method.

The measurement using the databases has been described. However, the use of the databases is not essential. If the databases are not used, the ion type is identified based on the peak potential at which the reduction current is maximized, without the use of a database. The peak potential at which the reduction current is maximized is pre-measured for a plurality of ion types likely to be present. The resultant peak potentials are checked against potentials obtained through measurement. Thus, the ion type for which the pre-measured potential is closest to the subsequently measured potential may be selected. Alternatively, the ion type may be determined based on known documents.

Furthermore, when the ion concentration is calculated based on the peak current value at which the reduction current is maximized, the peak current may be pre-measured for a plurality of concentrations for each ion type. For example, the relationship between the concentration and the current value may be examined to determine an arithmetic expression required to calculate the ion concentration. Then, the data obtained is checked against the current value obtained through measurement. The ion concentration can then be calculated. Alternatively, the ion concentration may be determined based on known documents.

[Embodiment 2]

The probe microscope shown in FIG. 1 was used to observe stainless steel as a specimen. The detection method is as follows.

Figure 11:
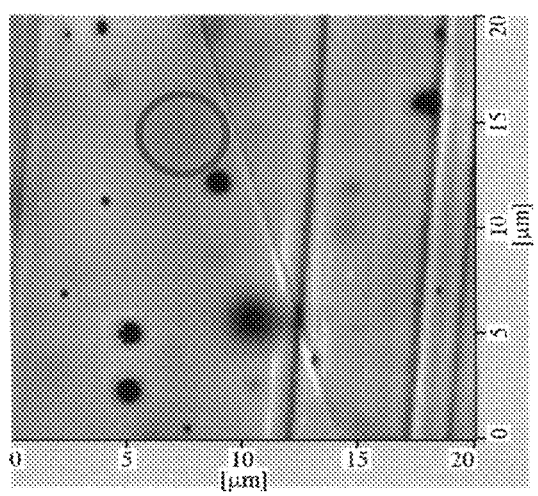
FIG. 11 is a diagram showing an example of an atomic force microscope image in which a specific point is marked.

(1) The measurement mode control section 9 selects the shape measurement mode. The conventional method is used to acquire an atomic force microscope image and the image is analyzed. At this point in time, a geometrical specific point such as a defective portion, a pit, or a raised portion is marked. (The position is shown by a circle in FIG. 11)

(2) The measurement mode control section 9 selects the ion measurement mode. The probe is moved to the marked X and Y coordinates. The distance on the Z axis is maintained constant at 20 nm or more and 10 μm or less.

(3) 0.1 mol of solution of sodium chloride is fed onto the surface of the specimen 7. The amount of the liquid fed may be small and has only to allow the probe tip to be immersed in the liquid.

(4) The current control section 12 built in the detection apparatus 8 controls a current flowing between the probe 3 and the counter electrode 4 in the direction of reduction. The conventional current control method is appropriately used. For example, in the chronopotentiometry method, in which the current is maintained constant, the current between the probe 3 and the counter electrode 4 is controllably maintained for any period of time. The potential measuring section 13 measures the potential between the probe 3 and the reference electrode 5. The potential measuring section 13 detects a reduction potential corresponding to a constant potential between the probe 3 and the reference electrode 5.

Figure 12:
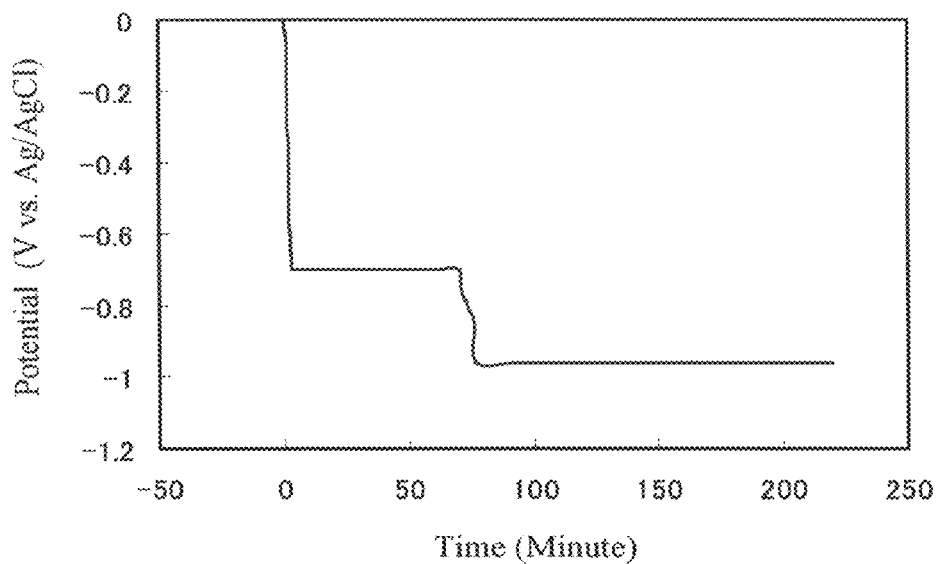
FIG. 12 is a diagram showing a potential curve in which the potential is plotted on the axis of ordinate, whereas time is plotted on the axis of abscissas.

(5) Based on a signal from the potential measuring section 13, the data conversion section 18 acquires a potential curve in which the potential is plotted on the axis of ordinate, whereas time is plotted on the axis of abscissas. The data display section 19 graphically displays this curve. FIG. 12 shows a potential curve in which the potential is plotted on the axis of ordinate, whereas time is plotted on the axis of abscissas. The reference electrode 5 is formed of Ag/AgCl.

(6) Based on the above-described potential, the data analysis section 21 identifies the ion type. Databases for a plurality of ion types likely to be present are pre-stored in the data analysis section 21. The data analysis section 21 checks a potential obtained through measurement against the databases to select the ion type for which the potential is closest to one of the database values. The electrochemical data on Fe shown in FIG. 2 and stored in the corresponding database indicates that a potential of −950 mV corresponds to Fe. Similarly, verification of electrochemical data on transition metals such as Ni, Co, and Cu which are stored in the databases indicates that a potential of −700 mV corresponds to Ni.

(7) The probe is moved to around the marked X and Y coordinates and similar measurement is performed at a plurality of the measurement positions.

Figure 13:
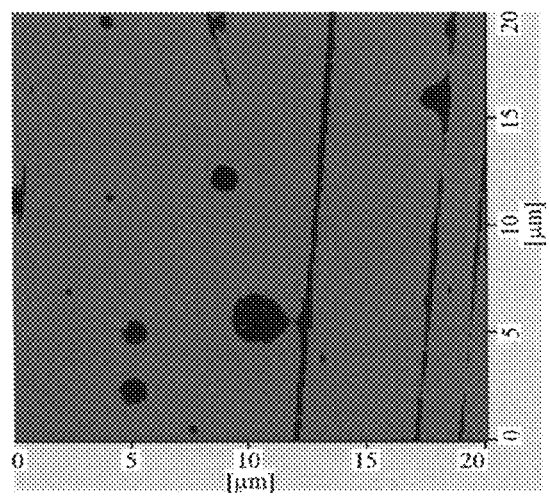
FIG. 13 is an image in which black parts indicate that Fe was detected therein, whereas purple parts indicate that both Fe and Ni were detected therein.

(8) The image processing section 20 is used to express each measurement position on the X and Y coordinate axes, while expressing the different ion types in the respective colors. The image processing section 20 thus images the data. FIG. 13 is an image in which black parts indicate that Fe was detected therein, whereas purple parts indicate that both Fe and Ni were detected therein. In this manner, the ions can be separately detected.

[Embodiment 3]

The atomic microscope in FIG. 1 was used to observe a semiconductor chip with Cu wiring of width 0.175 μm as a specimen.

Figure 14:
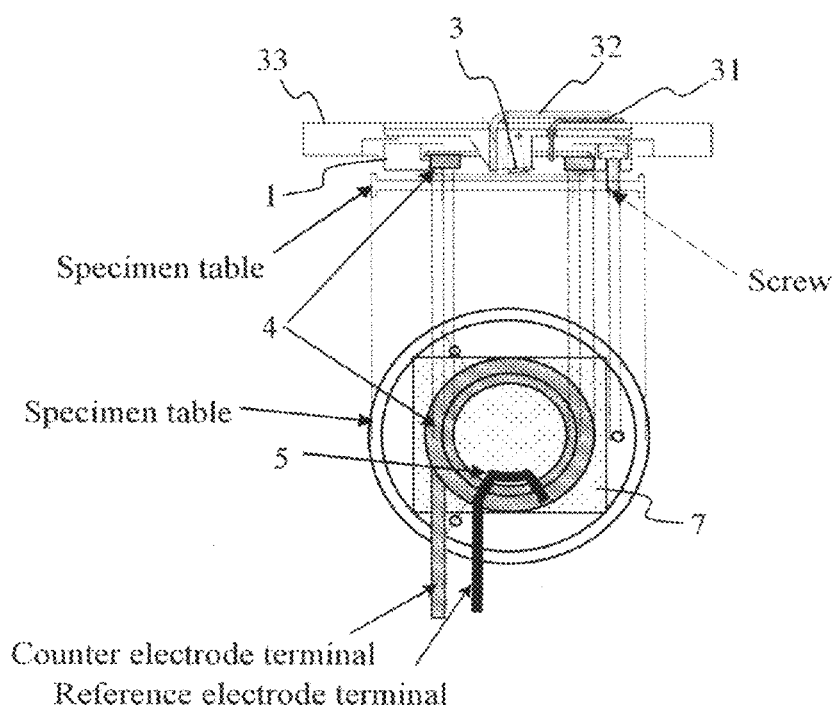
FIG. 14 is a sectional view and a top view of a test cell.

FIG. 14 is a sectional view and a top view of a test cell used. The test cell 1 includes an injection tube 31 and a discharge tube 32 configured to inject and discharge a liquid in the vicinity of the probe 3. When the surface shape of the specimen is observed from outside the liquid and impurities in the specimen are measured in the liquid, this configuration serves to prevent possible displacement to the positional relationship between the probe 3 and the specimen 7 when the liquid is injected and discharged. A holder 33 is located over the test cell 1 to hold the probe 3. The tubes 31 and 23 are fixed in the respective holes formed in the holder 33. This enables the liquid to be injected without the need to remove the holder 33, thus preventing the measurement area to be displaced by movement of the holder 33. The liquid is injected and discharged using the respective dedicated micro tube pumps. This allows a liquid injection speed and a liquid discharge speed to be controlled. As a result, the possible misalignment between the probe 3 and the specimen 7 can be reliably avoided. The liquid can be injected and discharged with the surface of the specimen 7 observed with the probe 3. Platinum was used for the counter electrode 4 and the reference electrode 5. Platinum and iridium were used for the probe 3.

Figure 15:
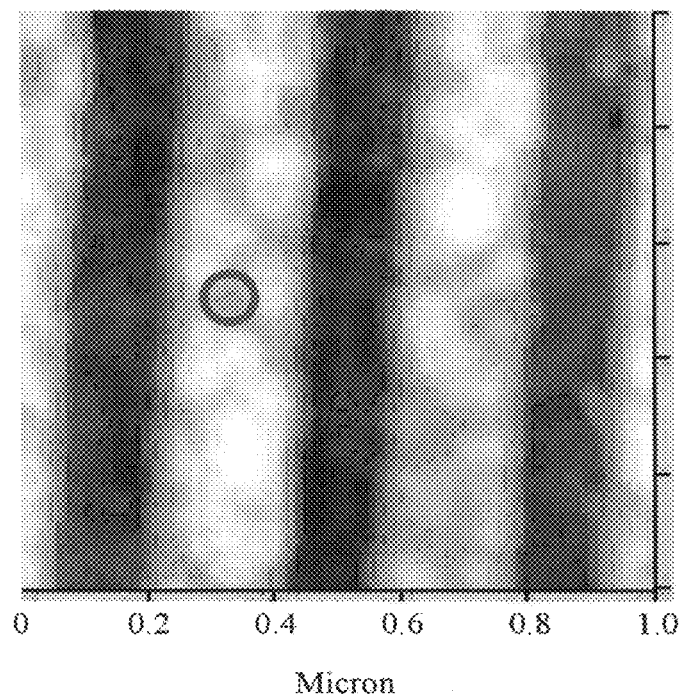
FIG. 15 is a diagram showing a shape image obtained by observing the microstructure of a specimen surface.

FIG. 15 shows a shape image obtained by observing the microstructure of the specimen surface by scanning a microprobe parallel to the specimen surface, while moving the probe perpendicularly to the specimen surface along the recesses and protrusions on the specimen surface.

Figure 16:
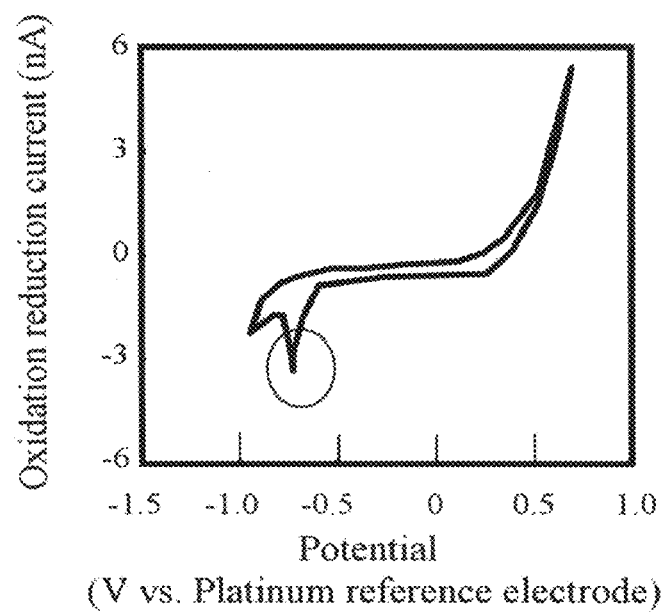
FIG. 16 is a diagram showing an example of a cyclic voltammogram.

In the ion measurement mode, the probe was moved to the position of a defect (shown by a circle in FIG. 15) which was 50 nm away from the specimen surface to measure a cyclic voltammogram. The liquid used was a mixture of acidum tartaricum and hydrogen peroxide. FIG. 16 shows the cyclic voltammogram. The cyclic voltammogram was obtained by scanning the probe so that the probe potential with respect to the reference electrode varies from 1.2 V to −1.0 V at a potential scan speed of 100 mV/sec., while measuring the value of a current flowing between the counter electrode and the probe.

At −0.8 V, a current flows which significantly indicates reduction. Thus, dissolution of Cu was sensed on the semiconductor chip with the Cu wiring of width 0.175 μm.

The configurations of a conventional scanning tunneling microscope for submerged observation, a conventional scanning atomic force microscope, and a conventional scanning atomic force microscope for submerged observation are shown below as comparative examples and differences from the present invention will be described.

COMPARATIVE EXAMPLE 1

Figure 17:
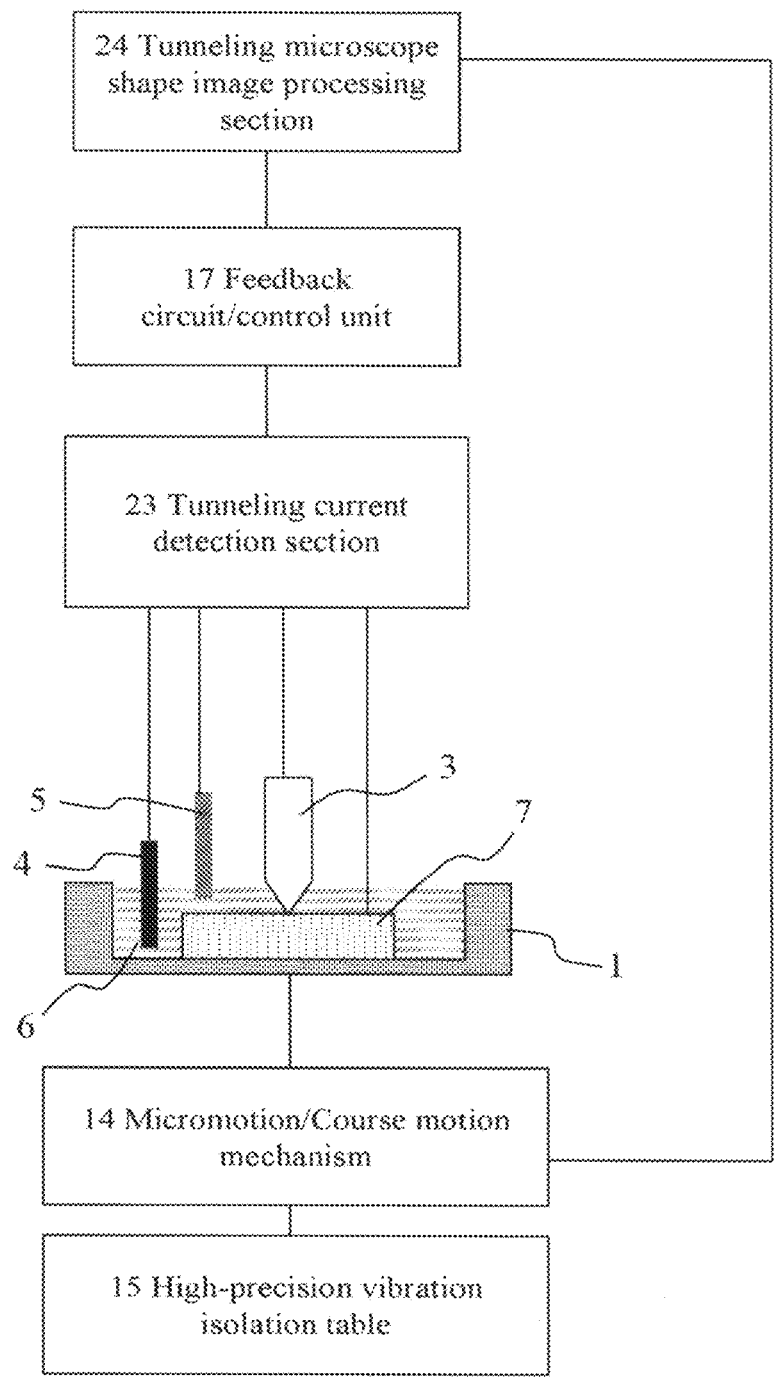
FIG. 17 is a schematic diagram showing a conventional scanning tunneling microscope for submerged observation.

FIG. 17 is a schematic diagram showing a conventional scanning tunneling microscope for submerged observation. As in the case of Embodiments 1 and 2, the microscope includes a test cell 1, a probe 3, a counter electrode 4, a reference electrode 5, a micromotion/coarse motion mechanism 14, and a high-precision vibration isolation table 15.

The tunneling microscope applies a voltage to between the specimen 7 and the probe 3 and detects a tunneling current. Then, to maintain the tunneling current constant, the tunneling microscope uses a feedback circuit/control unit 17 to feedback-control the micromotion/coarse motion mechanism 14. A tunneling current signal from a tunneling current detection section 23 and a control signal from the feedback circuit/control unit 17 are subjected to data processing by a tunneling microscope image processing section 24. Thus, a shape image for the tunneling microscope is obtained. However, the conventional scanning tunneling microscope for submerged observation includes a step of scanning with the probe to measure the recessed and protruding shape of the specimen but none of a step of fixing the probe at a particular position in a liquid near the specimen surface corresponding to the measured shape, a step of controlling the potential between the probe and the reference electrode both immersed in the liquid and measuring the current between the probe and the counter electrode, a step of detecting the potential at which the current indicates a peak, a step of identifying the ion species in the liquid based on the potential at which the current indicates a peak, and a step of determining the ion concentration based on the magnitude of the peak current. Thus, the tunneling microscope includes none of the detection section 8, data conversion section 18, data display section 19, and image processing section 20 according to the present invention shown in FIG. 1.

COMPARATIVE EXAMPLE 2

Figure 18:
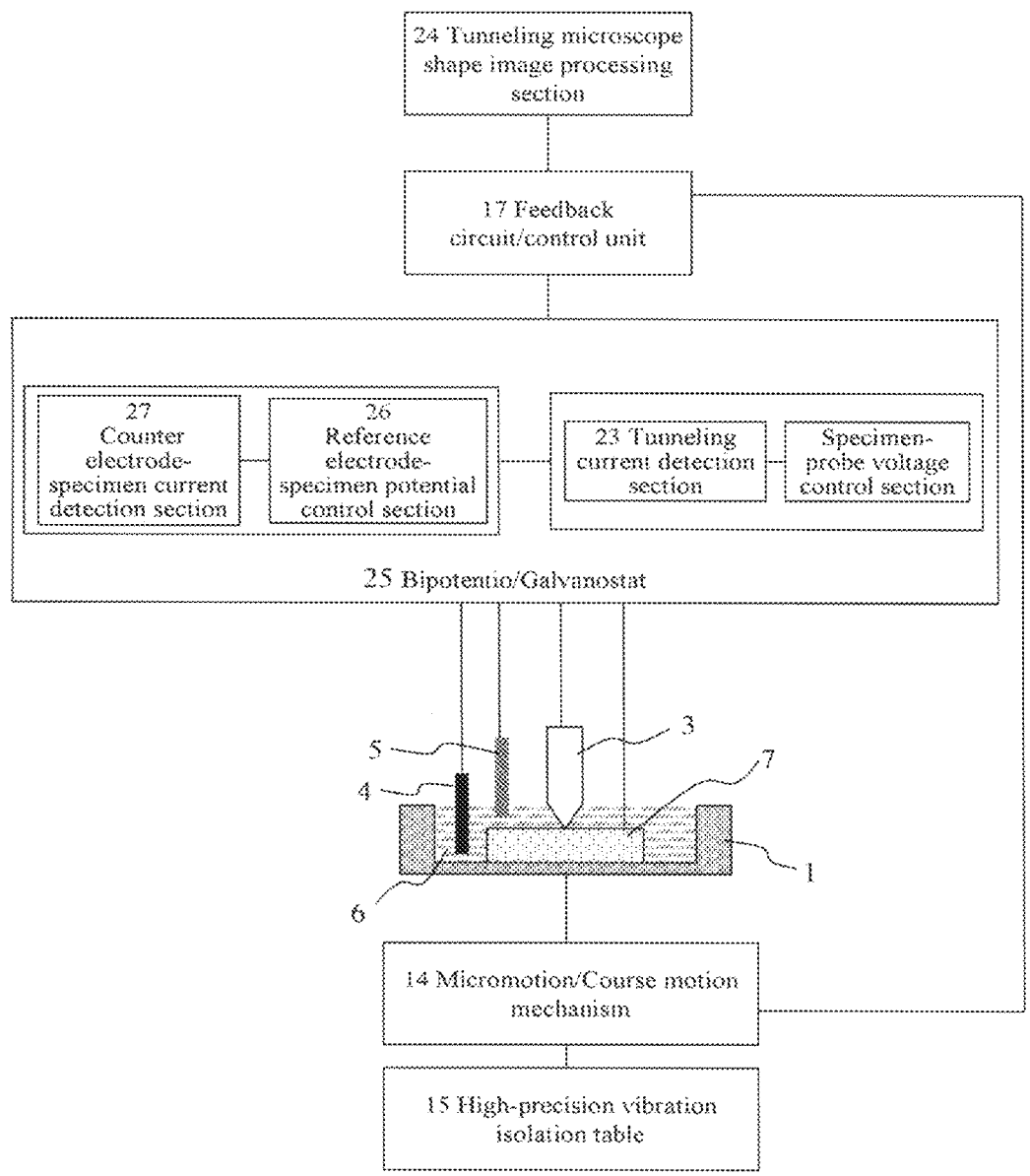
FIG. 18 is a schematic diagram of a conventional scanning tunneling microscope.

FIG. 18 is a schematic diagram of a conventional scanning tunneling microscope. A bipotentiostat/galvanostat 25 includes a reference electrode 5-specimen 7 potential control section 26 configured to control the potential between the reference electrode 5 and the specimen 7, and a counter electrode 4-specimen 7 current detection section 27 configured to detect a current flowing through the specimen. Obviously, the bipotentiostat/galvanostat 25 is configured differently from the detection section 8 according to the present invention.

COMPARATIVE EXAMPLE 3

Figure 19:
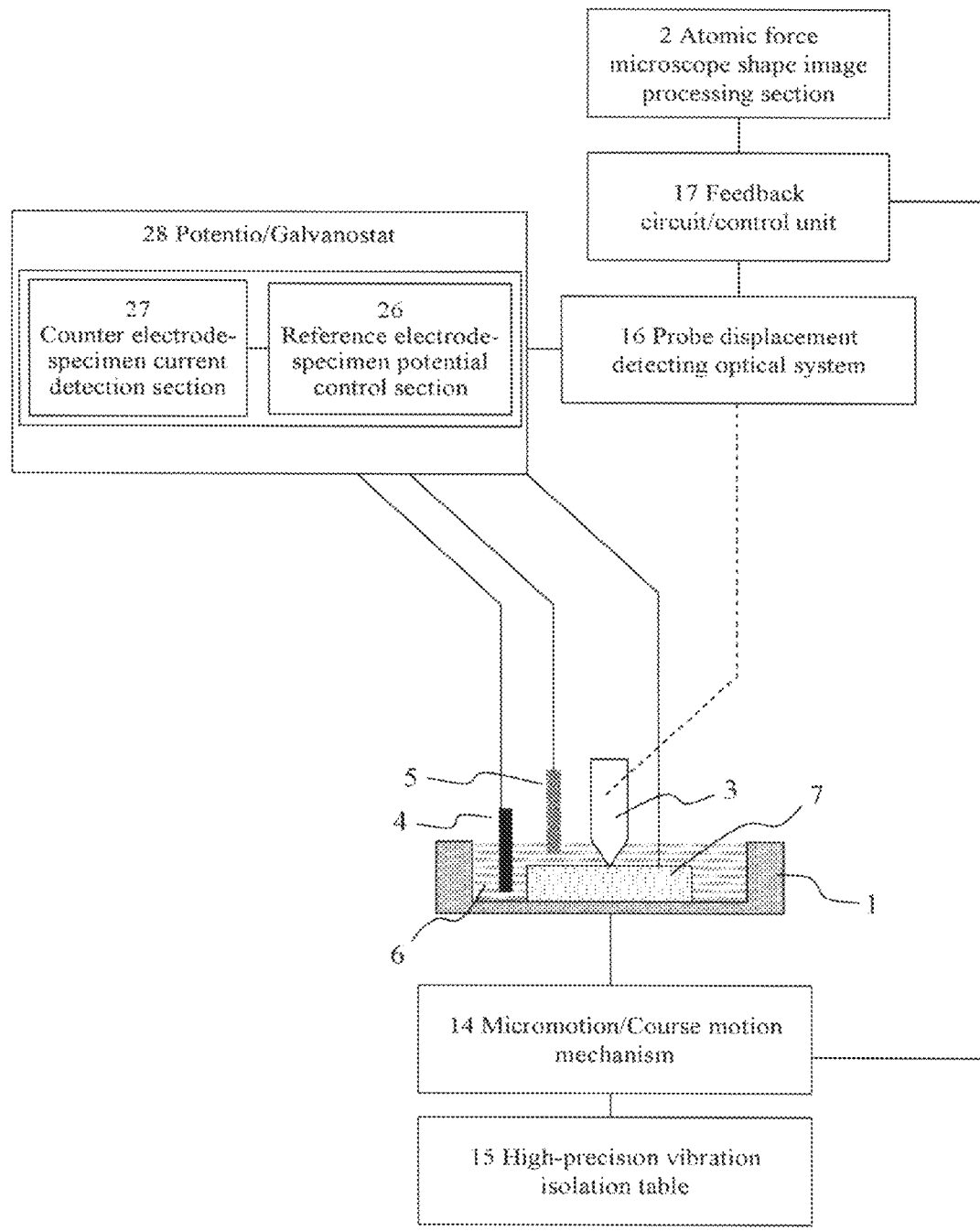
FIG. 19 is a schematic diagram showing a conventional scanning atomic force microscope for submerged observation.

FIG. 19 is a schematic diagram showing a conventional scanning atomic force microscope for submerged observation. A specimen 7 is housed in a test cell 1 filled with a liquid 6. The specimen 7 is connected to a potentiostat/galvanostat 28 via an electric continuation section (not shown in the drawings). A probe 3, a counter electrode 4, and a reference electrode 5 are housed in the test cell 1 so as to be immersed in the liquid 6. The test cell 1 is located on a micromotion/coarse motion mechanism 14. The micromotion/coarse motion mechanism 14 includes an XYZ micromotion mechanism configured to be relatively movable in the horizontal (XY) and vertical (X) directions with respect to the probe 3, and a Z axis coarse-motion mechanism configured to allow the specimen 7 and probe 3 located away from each other to approach each other. Furthermore, the micromotion/coarse motion mechanism 14 is placed on a high-precision vibration isolation table 15 in order to isolate external vibration.

The scanning atomic force microscope includes a probe displacement detecting optical system 16. The probe displacement detecting optical system 16 is composed of a light source and a photo detector. The probe displacement detecting optical system 16 is configured such that the optical axis of detection light from the light source impinges on the tip of the probe 3, thus allowing reflected light from the tip of the probe 3 to be detected. The probe 3 is moved, by the micromotion/coarse motion mechanism 14, closer to the specimen 7 to an area where the probe and the specimen interact with each other. A probe displacement signal is then output to a feedback circuit/control unit 17. The feedback circuit/control unit 17 uses the micromotion/coarse motion mechanism 14 to feedback-control the distance between the probe 3 and the specimen 7 so as to maintain the quantity of reflected light constant. Furthermore, the probe displacement signal from the probe displacement detecting optical system 16 and a control signal from the feedback circuit/control unit 17 are subjected to data processing by an atomic force microscope image processing section 2 to obtain a shape image for the atomic force microscope. Therefore, the ion detection according to the present invention is not carried out.

What is claimed is:

1. A probe microscope comprising: a test cell configured to hold a specimen and receive a liquid; a probe; a counter electrode; a reference electrode; a driving mechanism configured to cause the probe to scan based on a principle of an atomic force microscope so that the probe follows a specimen surface; a potential control section configured to control a potential between the probe and the reference electrode; and a current measuring section configured to measure a current flowing between the probe and the counter electrode, wherein with the probe located at a predetermined distance, in the liquid, away from the specimen surface measured based on the principle of the atomic force microscope, the potential control section controls the potential between the probe and the reference electrode, the current measuring section measures the current flowing between the probe and the counter electrode, and the type of ions in the liquid is detected based on the potential at which the measured current indicates a peak.

2. The probe microscope according to claim 1, wherein an ion concentration is determined based on the magnitude of the current indicating a peak.

3. The probe microscope according to claim 1, further comprising a database configured to store, as data, a relationship between the ion type and the potential at which the current measured by the current measuring section indicates a peak, wherein with the probe located at a predetermined distance, in the liquid, away from the specimen surface measured based on the principle of the atomic force microscope, the potential control section controls the potential between the probe and the reference electrode, the current measuring section measures the current flowing between the probe and the counter electrode, and the measurement result is checked against the database to detect the type of the ions in the liquid.

4. The probe microscope according to claim 3, wherein the database is configured to store data indicating the relationship between the ion concentration and the magnitude of the current indicating a peak, and the measurement result is checked against the database to determine the ion concentration.

5. The probe microscope according to claim 1, further comprising a display section configured to display a curve in which a current measured at each measurement position with respect to any potential is plotted by expressing the current on an axis of ordinate, while expressing time on an axis of abscissas, or a curve in which a measured current is plotted by expressing the current on the axis of ordinate, while expressing the potential on the axis of abscissas.

6. The probe microscope according to claim 2, further comprising a display section configured to display the ion type and/or the ion concentration at each measurement position.

7. A probe microscope comprising: a test cell configured to hold a specimen and receive a liquid; a probe; a counter electrode; a reference electrode; a driving mechanism configured to cause the probe to scan based on a principle of an atomic force microscope so that the probe follows a specimen surface; a current control section configured to control a current flowing between the probe and the counter electrode: and a potential measuring section configured to measure a potential between the probe and the reference electrode, wherein with the probe located at a predetermined distance, in the liquid, away from the specimen surface measured based on the principle of the atomic force microscope, the current control section controls the current flowing between the probe and the counter electrode, the potential measuring section measures the potential between the probe and the reference electrode, and the type of ions in the liquid is detected based on the value of a constant measured potential.

8. The probe microscope according to claim 7, wherein an ion concentration is determined based on a time when the constant potential is indicated.

9. The probe microscope according to claim 7, further comprising a database configured to store a relationship between the ion type and the value of a constant potential measured by the potential measuring section, wherein with the probe located at a predetermined distance, in the liquid, away from the specimen surface measured based on the principle of the atomic force microscope, the current control section controls the current flowing between the probe and the counter electrode, the potential measuring section measures the potential between the probe and the reference electrode, and the measurement result is checked against the database to detect the type of the ions in the liquid.

10. The probe microscope according to claim 9, wherein the database is configured to store data indicating the relationship between the ion concentration and the time when the constant potential is indicated, and the measurement result is checked against the database to detect the ion concentration.

11. The probe microscope according to claim 7, further comprising a display section configured to display a curve in which a potential measured at each measurement position with respect to any current is plotted based on a signal obtained from the potential measuring section by expressing the potential on an axis of ordinate, while expressing time on an axis of abscissas, or a curve in which a measured potential is plotted by expressing the potential on the axis of ordinate, while expressing the current on the axis of abscissas.

12. The probe microscope according to claim 8 or claim 10, further comprising a display section configured to display the ion type and/or the ion concentration at each measurement position.

13. A measurement method comprising: a step of scanning with a probe based on a principle of an atomic force microscope in an environment involving one of air, vacuum, atmosphere gas, and liquid, to measure a recessed and protruding shape of a specimen; a step of fixing the probe to a particular position in a liquid near a surface of the specimen corresponding to the measured shape; a step of controlling a potential between the probe and a reference electrode both immersed in the liquid and measuring a current between the probe and a counter electrode to detect the potential at which the current indicates a peak; a step of identifying an ion species in the liquid based on the potential at which the current indicates a peak; and a step of determining an ion concentration based on the magnitude of the peak current.

14. The measurement method according to claim 13, wherein the ion type is determined based on an oxidation potential and/or a reduction potential of ions present in the liquid.

15. A measurement method comprising: a step of scanning with a probe based on a principle of an atomic force microscope in an environment involving one of air, vacuum, atmosphere gas, and liquid, to measure a recessed and protruding shape of a specimen; a step of fixing the probe to a particular position in a liquid near a surface of the specimen corresponding to the measured shape; a step of controlling a current between the probe and a counter electrode both immersed in the liquid and measuring a potential between the probe and a reference electrode to detect the value of a constant measured potential; a step of identifying an ion species in the liquid based on the detected potential; and a step of determining an ion concentration based on a time when the constant potential is indicated.

16. The measurement method according to claim 15, wherein the ion concentration is determined based on an oxidation current and/or a reduction current of ions present in the liquid.

17. The measurement method according to claim 13, wherein after the recessed and protruding shape of the specimen is measured, the probe is fixed to a position at least 20 nm and at most 10 µm above the specimen surface.

18. The measurement method according to claim 15, wherein after the recessed and protruding shape of the specimen is measured, the probe is fixed to a position at least 20 nm and at most 10 µm above the specimen surface.

* * * * *